(12) United States Patent
Khaleghimeybodi et al.

(10) Patent No.: US 11,470,439 B1
(45) Date of Patent: Oct. 11, 2022

(54) ADJUSTMENT OF ACOUSTIC MAP AND PRESENTED SOUND IN ARTIFICIAL REALITY SYSTEMS

(71) Applicant: Meta Platforms Technologies, LLC, Menlo Park, CA (US)

(72) Inventors: Morteza Khaleghimeybodi, Bothell, WA (US); Antonio John Miller, Woodinville, WA (US); Vladimir Tourbabin, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/336,817

(22) Filed: Jun. 2, 2021

(51) Int. Cl.
| | |
|---|---|
| *H04S 7/00* | (2006.01) |
| *H04R 5/04* | (2006.01) |
| *G02B 27/01* | (2006.01) |
| *H04R 1/40* | (2006.01) |
| *H04R 29/00* | (2006.01) |
| *G06F 3/01* | (2006.01) |
| *H04R 1/10* | (2006.01) |
| *G06F 3/16* | (2006.01) |
| *G02B 27/00* | (2006.01) |

(52) U.S. Cl.
CPC .......... *H04S 7/307* (2013.01); *G02B 27/0093* (2013.01); *G02B 27/017* (2013.01); *G06F 3/013* (2013.01); *G06F 3/017* (2013.01); *G06F 3/165* (2013.01); *H04R 1/1016* (2013.01); *H04R 1/406* (2013.01); *H04R 5/04* (2013.01); *H04R 29/008* (2013.01); *G02B 2027/0138* (2013.01)

(58) Field of Classification Search
CPC .. H04R 3/005; H04R 1/406; H04R 2201/405; H04R 29/001; H04R 29/008; H04R 3/002; H04R 3/007; H04R 5/04; H04R 1/1016; H04R 1/105; H04R 1/1058; H04R 1/1083; H04R 1/028; H04R 1/04; H04R 1/08; H04R 1/10; H04R 1/28; H04R 1/342; H04R 2430/20; H04R 2499/10; H04R 2499/15; H04R 3/00; H04S 2400/15; H04S 7/302; H04S 7/40; H04S 2400/11; H04S 2420/03; H04S 3/00; H04S 7/301; H04S 7/303
USPC ....................................... 381/98, 74; 700/94
See application file for complete search history.

(56) References Cited

U.S. PATENT DOCUMENTS

| | | |
|---|---|---|
| 8,183,997 B1 | 5/2012 | Wong et al. |
| 9,218,698 B2 | 12/2015 | Ricci |
| 10,638,248 B1 * | 4/2020 | Dodds .............. G10K 11/17813 |
| 11,234,095 B1 * | 1/2022 | Cho ..................... G06V 40/171 |

(Continued)

OTHER PUBLICATIONS

Inoue, A. et al. "Visualization System for Sound Field Using See-Through Head-Mounted Display." Acoust. Sci. &Tech., vol. 40, No. 1, 2019, pp. 1-11.

(Continued)

*Primary Examiner* — Lun-See Lao
(74) *Attorney, Agent, or Firm* — Fenwick & West LLP

(57) ABSTRACT

A headset generates an acoustic map that is a visual representation of sound pressure of sound within a local area. The acoustic map is displayed as a virtual object that is overlaid onto visual content being presented by the headset. Sound is adjusted in accordance with a command. The acoustic map is updated based on the adjusted sound, and the adjusted sound is presented and the updated acoustic map is presented.

20 Claims, 9 Drawing Sheets

(56) References Cited

U.S. PATENT DOCUMENTS

| | | | |
|---|---|---|---|
| 2011/0280422 A1* | 11/2011 | Neumeyer | H04R 25/554 |
| | | | 381/314 |
| 2016/0088417 A1 | 3/2016 | Kim et al. | |
| 2017/0019744 A1 | 1/2017 | Matsumoto et al. | |
| 2017/0332186 A1* | 11/2017 | Riggs | H04S 7/301 |
| 2020/0129850 A1 | 4/2020 | Ohashi | |

OTHER PUBLICATIONS

Su, F. et al. "Acoustic Imaging Using a 64-Node Microphone Array and Beamformer System." 2015 IEEE International Symposium on Signal Processing and Information Technology (ISSPIT), Dec. 7-10, 2015, pp. i-88.

* cited by examiner

US 11,470,439 B1

ADJUSTMENT OF ACOUSTIC MAP AND PRESENTED SOUND IN ARTIFICIAL REALITY SYSTEMS

FIELD OF THE INVENTION

This disclosure relates generally to artificial reality systems, and more specifically to adjustment of an acoustic map and presented sound in artificial reality systems.

BACKGROUND

Conventional augmented reality (AR) headsets may present audio and visual content. However, conventional AR headsets generally do not provide a visual representation of sound in a local area as visual content, nor do they allow a user to manipulate the visual representation in order to modify how the sound is being presented to the user.

SUMMARY

An artificial reality headset that provides for adjustment of an acoustic map and presented sound. The headset includes a microphone array, a display, and a controller. The microphone array detects sound emitted from sounds sources in a local area of the headset. The display may present visual content (e.g., virtual objects) in accordance with instructions from the controller. The visual content may be a combination of light from the local area and one or more virtual objects (e.g., augmented reality), or purely virtual (e.g., virtual reality). The presented visual content includes an acoustic map. The acoustic map may be, e.g., a visual representation of sound pressure (e.g., as a function of location within the local area). Responsive to a command, the controller adjusts the sound and adjusts the acoustic map. The adjusted acoustic map may be presented by the display. The adjusted sound may be presented via, e.g., an in-ear device. In other embodiments, the controller generates audio content that is presented by a speaker array on the headset, and the presented audio content combines with the sound to form the adjusted sound.

In some embodiments a method is described. The method includes generating an acoustic map that is a visual representation of sound pressure of sound within a local area of the headset. The method further includes presenting, via a display of the headset, the acoustic map as a virtual object that is overlaid onto visual content being presented to a user of the headset, and adjusting the sound in accordance with a command. The method further includes updating the acoustic map based on the adjusted sound, and presenting updated acoustic map to the user, wherein the adjusted sound is also presented to the user.

In some embodiments a headset is described. The headset includes a microphone array, a display, and a controller. The microphone array is configured to detect sound in a local area of the headset. The display is configured to present visual content to a user. The controller is configured to generate an acoustic map that is a visual representation of sound pressure of sound within a local area of the headset. The controller is also configured to instruct the display to present the acoustic map as a virtual object that is overlaid onto the visual content being presented to the user, and adjust the sound in accordance with a command. The controller is also configured to update the acoustic map based on the adjusted sound, and instruct the display to present the updated acoustic map, wherein the adjusted sound is presented to the user.

In some embodiments, a non-transitory computer readable medium is described. The non-transitory computer readable medium is configured to store program code instructions, that when executed by a processor, cause the processor to perform steps. The steps comprising: generating an acoustic map that is a visual representation of sound pressure of sound within a local area of the headset, and presenting, via a display of the headset, the acoustic map as a virtual object that is overlaid onto visual content being presented to a user of the headset. The steps also include adjusting the sound in accordance with a command, updating the acoustic map based on the adjusted sound; and presenting, via the display, the updated acoustic map to the user, and wherein the adjusted sound is also presented to the user.

Figure 1A:
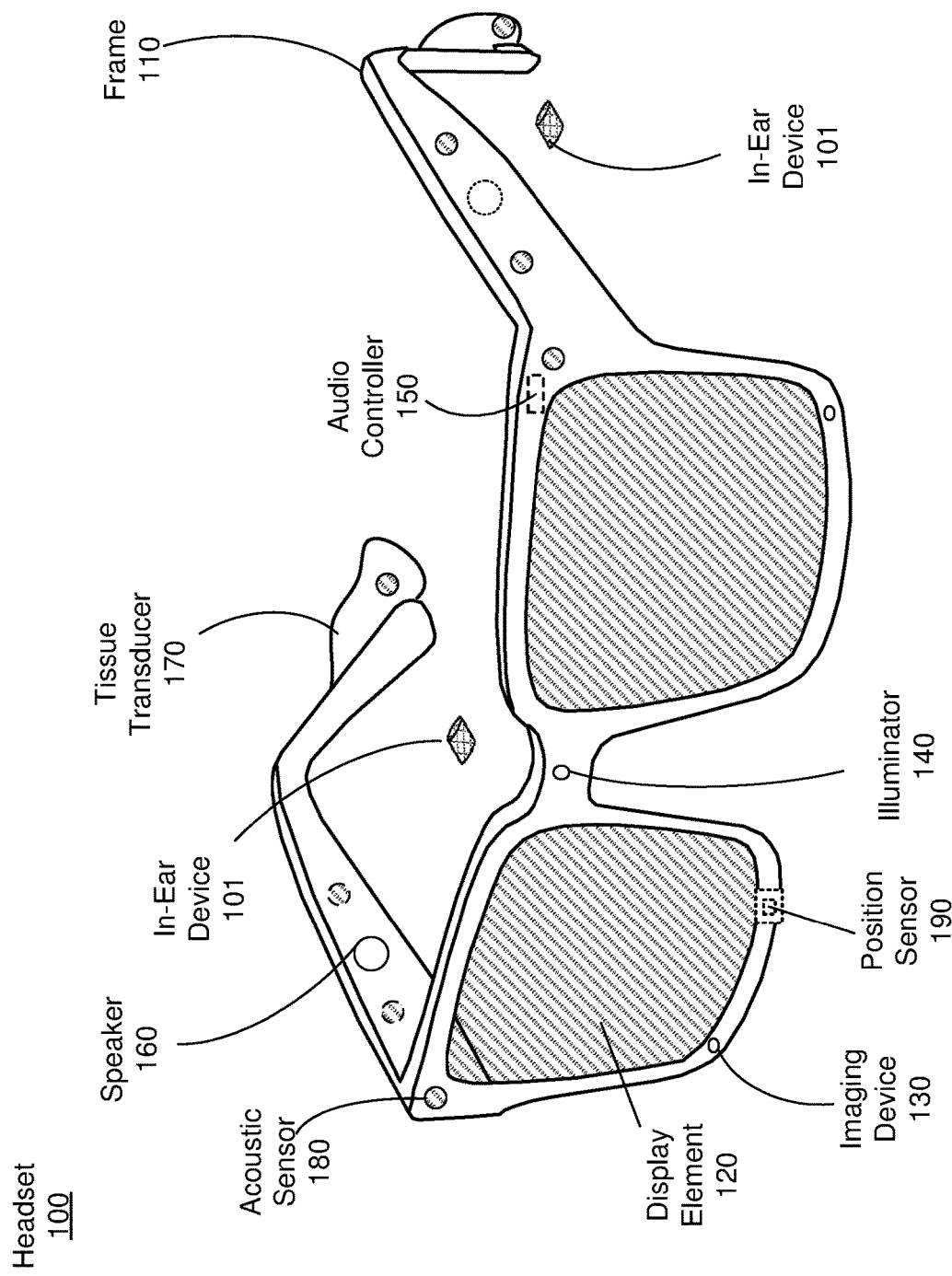
FIG. 1A is a perspective view of a system that includes a headset implemented as an eyewear device and a pair of in-ear devices, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An artificial reality headset that provides for adjustment of an acoustic map and presented sound. The acoustic map describes sound pressure distribution as a function of location within a local area of the headset. The headset includes a microphone array, a display, and a controller. The microphone array detects sound emitted from sounds sources in a local area of the headset.

The display presents one or more virtual objects in accordance with instructions from the controller. The visual content may be, e.g., a combination of light from the local area and one or more virtual objects (e.g., augmented reality), or purely virtual (e.g., virtual reality). The presented visual content includes an acoustic map. The one or more virtual objects include the acoustic map. The display presents the acoustic map such that it appears to overlay other visual content being presented. The acoustic map may overlap some or all of a field of view of the display.

Responsive to a command, the controller adjusts the sound and adjusts the acoustic map. The command may come from, e.g., a gesture made by the user, a selection of a button, etc. The gesture may be detected via, e.g., one or more cameras on the headset, eye tracking information, etc. The gestures may include, e.g., a pinch gesture, a wave gesture, a stretch gesture, etc., which cause the controller to affect the acoustic map and the sound in different ways. For example, a pinch gesture may be used to adjust (e.g., reduce) sound pressure in a particular location of the local area without affecting sound from other sound sources. As such, the acoustic map is updated to show the reduced sound pressure in the particular area. The adjusted acoustic map may be presented by the display. In this manner a user may selectively attenuate (or amplify) sound from specific sound sources in the local area.

In some embodiments, the adjusted sound may be presented via one or more in-ear devices (e.g., one for the left ear and one for the right ear). The in-ear device includes a speaker and is communicatively coupled to the headset. The in-ear devices may be configured to attenuate sound from the local area, and re-broadcast the sound from the local area in accordance with instructions from the controller. Accordingly, the controller may instruct the re-broadcast sound that has been adjusted in some manner (e.g., responsive to the command).

In other embodiments, the controller generates audio content that is presented by a speaker array on the headset. The audio content is generated such that after it would combine with the sound in the local area to form the adjusted sound.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a system that includes a headset 100 implemented as an eyewear device and a pair of in-ear devices 101, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame 110, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The DCA may include an eye tracking unit that determines eye tracking information. In some embodiments, the eye tracking unit may be separate from the DCA. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. The headset 100 may prompt the user to opt in to allow operation of the eye tracking unit. For example, by opting in the headset 100 may detect, store, images of the user's any or eye tracking information of the user.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents audio content to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A. In some embodiments, the audio content presented by the transducer array combines with sound from the local area to form adjusted sound (e.g., sound from a particular sound source is minimized) which is presented to the user.

In some embodiments, the audio system of the headset 100 provides audio content to the user of the headset via in-ear devices 101 for either or both ears of the user. The in-ear devices 101 may include one or more transducers, internal and external microphones, and other electronics, including a power supply, a receiver or a transceiver, and an in-ear device controller.

The in-ear device 101 may be cylindrical, spherical, or any other shape solid object that can be inserted into an ear of the user. Some embodiments of the in-ear device 101 may involve an over-molded housing or cover that entirely encapsulates the transducer, and the internal and external microphones (if one or both are present. In some embodiments, the in-ear device 101 is configured to be located entirely inside the ear canal of the user. In some embodiments, a small portion of the in-ear device 101 may sit (or extend) outside the ear canal, however a majority portion of the in-ear device is configured to be located within the ear canal.

In some embodiments, the audio system may receive information about acoustic pressure within the ear canal (e.g., from an internal microphone) or in a local area around the ear (e.g., detected by an external microphone) from the in-ear device. This information may be used by the audio system to send updated audio content to the in-ear devices 101 via the audio controller 150.

The in-ear devices 101 in the ear-canals may mitigate or prevent sound from the local area from reaching the ear drums of the user. The in-ear device 101 may be instructed by the controller to re-broadcast some or all of the sound in the local area to the user. Moreover, as described below, the sound may be adjusted in accordance with instructions from the controller. For example, sound may globally be decreased (e.g., responsive to a wave gestures).

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The audio controller 150 generates an acoustic map (e.g., as described below with regard to FIGS. 2 and 3) that is a visual representation of sound pressure of sound within a local area of the headset 100. The audio controller 150 instructs one or both of the display elements 120 to present the acoustic map as a virtual object that is overlaid onto the visual content being presented to the user.

The audio controller 150 adjusts the sound in accordance with a command. The command may be gesture (e.g., pinch gesture, wave gesture, etc.), a voice command, some other input from the user (e.g., button push, etc.), etc. Examples of gestures and their affects are discussed in detail below with regard to FIGS. 3-6. The audio controller 150 may use information from the eye tracking unit and/or one or more camera assemblies (e.g., the DCA and/or passive camera assembly) in order to determine whether a pose of the user corresponds to a particular gesture. The audio controller 150 is configured to update the acoustic map based on the adjusted sound, and instruct one or both of the display elements 120 to present the updated acoustic map. The audio controller 150 may instruct one or both of the in-ear devices 101 to present the adjusted sound. In some embodiments, the audio controller 150 may generate audio content such that when combined with sound from the local area it generates the adjusted sound that is presented to the user, and then instructs the transducer array to present the generated audio content to the user. In some embodiments, the adjusted sound may be presented to the user via both the in-ear devices and the transducer array. The audio controller is described in detail with regard to FIG. 2.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Moreover images from the PCT and/or DCA may be provided to the audio controller 150 for, e.g., determine whether a gesture is being performed by the user. Additional details regarding the components of the headset 100 are discussed below in connection with FIG. 8.

Figure 1B:
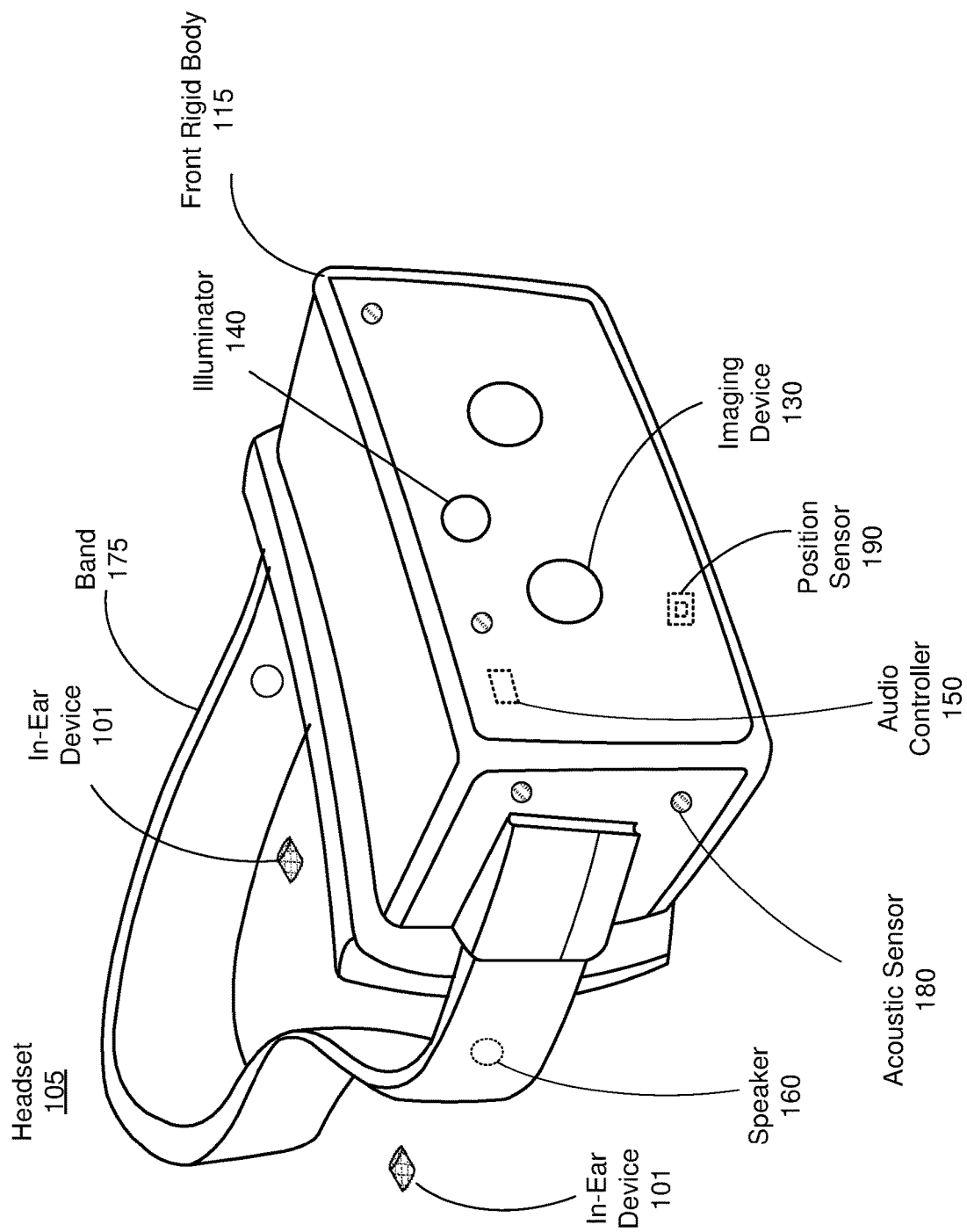
FIG. 1B is a perspective view of a system that includes a headset implemented as a head-mounted display and a pair of in-ear devices, in accordance with one or more embodiments.

FIG. 1B is a perspective view of a system that includes a headset 105 implemented as a head-mounted display and the pair of in-ear devices 101, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, the audio controller 150, a plurality of acoustic sensors 180, and the position sensor 190. The speakers 160 may be located in various locations, such as coupled to the band 175 (as shown), coupled to front rigid body 115, or may be configured to be inserted within the ear canal of a user. The audio system and the in-ear devices 101 function in a manner similar to that described for FIG. 1B.

Figure 2:
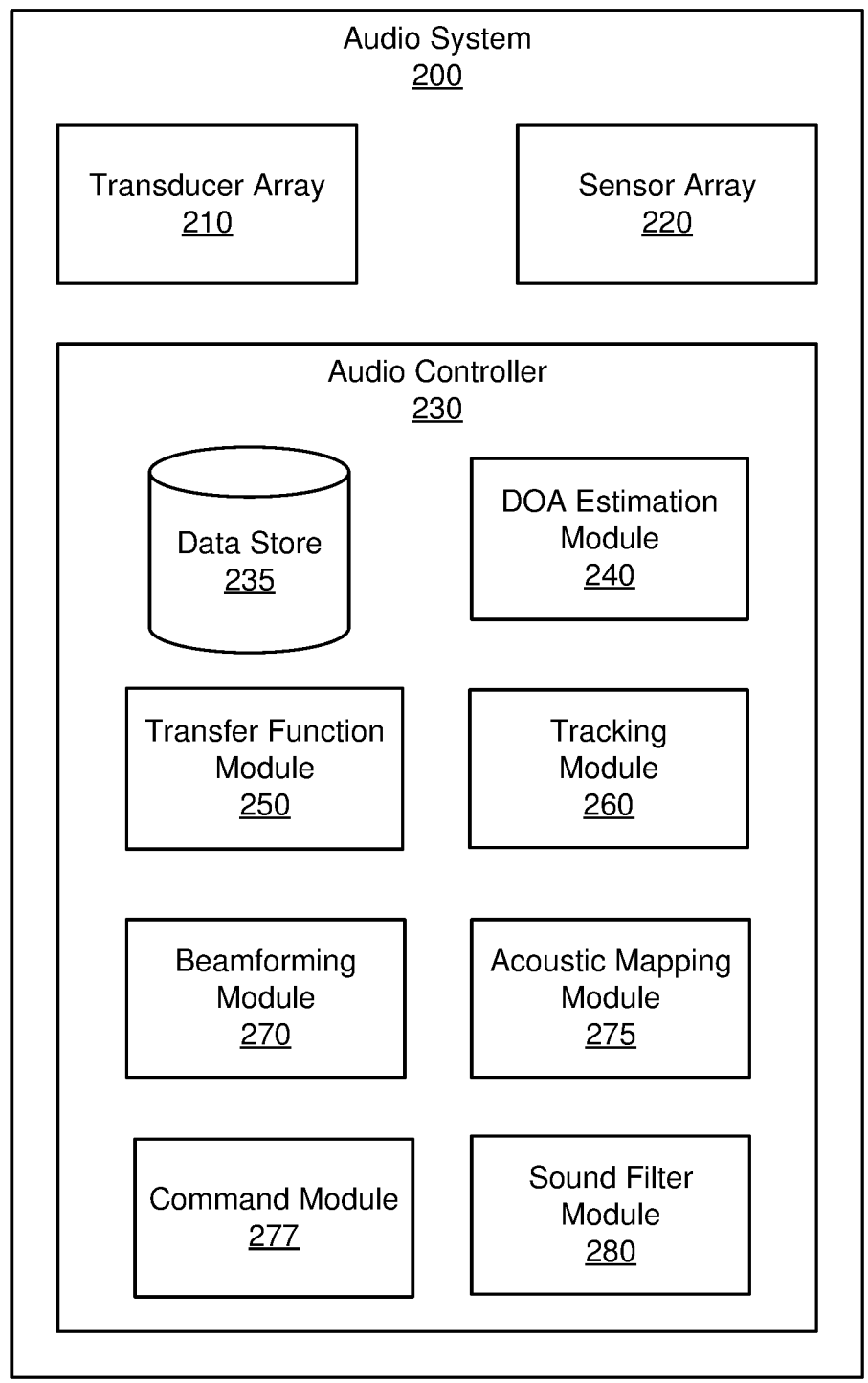
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, particle velocity sensor, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a DOA estimation module 240, a transfer function module 250, a tracking module 260, a beamforming module 270, an acoustic mapping module 275, a command module 277, and a sound filter module 280. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, model of local area, acoustic maps, direction of arrival estimates, sound filters, sound detected from the local area, acoustic content, eye tracking information, gesture information, and other data relevant for use by the audio system 200, or any combination thereof.

The user may opt-in to allow the data store 235 to record data captured by the audio system 200. In some embodiments, the audio system 200 may employ always on recording, in which the audio system 200 records all sounds captured by the audio system 200 in order to improve the experience for the user. The user may opt in or opt out to allow or prevent the audio system 200 from recording, storing, or transmitting the recorded data to other entities.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the sound pressure, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The acoustic mapping module 275 maps the detected sound to locations in the local area for various position and/or orientations of the headset. The acoustic mapping module 275 updates the model with the mapping. In some embodiments, the model also stores a time period associated with the mapped information. As such, given a particular location within the local area at a particular time, the model can provide sound of the sound associated with that particular location at that particular time. Note that this mapping can provide a continuous representation of sound within the local area as a function of position, this may also be referred to as "a sound field."

The acoustic mapping module 275 determines what portion of the local area is within a field of view of the headset for a current position and orientation of the headset within the local area. The acoustic mapping module 275 may determine the current position and orientation of the headset using the model, position information from the position sensor 190, information from the DCA, PCA, etc., or some combination thereof. Given the determined position and orientation of the headset the acoustic mapping module 275 determines the portion of the local area that corresponds to the field of view of the headset.

In some embodiments, the acoustic mapping module 275 generates an acoustic map for a position and orientation of a headset within the local area. The acoustic mapping module 275, using the model, identifies a high boundary value and a low boundary value for the sound pressure distribution associated with the local area. The high boundary value may be, e.g., a highest sound pressure of sound pressure distribution, some other sound pressure value (e.g., may be set by the user) that is higher than the low boundary value. The low boundary value may be, e.g., a lowest sound pressure of the sound pressure distribution, some other sound pressure value (e.g., arbitrary threshold value, some value set by the user) that is lower than the high boundary value. In some embodiments, there may be sound pressure values higher than the high boundary value and/or lower than the low boundary value. The acoustic mapping module 275 assigns a range of colors to the sound pressure values that are bounded by the high boundary value and the low boundary value. For example, the acoustic mapping module 275 may assign red to high boundary value and blue to sound pressure values at the low boundary value, and a range of colors (e.g., orange, yellow, green, etc.) for different intermediate sound pressure values that range between the high boundary value and the low boundary value. In some embodiments, for sound pressure that is below the low value, no color is assigned (i.e., the acoustic map is fully transparent and colorless at that position).

The acoustic mapping module 275 identifies at least the portion of the acoustic map associated with the determined portion of the local area that corresponds to the field of view of the headset. The acoustic mapping module 275 provides the identified portion of the acoustic map to a display assembly for presentation to a user of the headset. As noted above, the display assembly may then present the acoustic map as a virtual object that is overlaid onto the visual content being presented to the user. Note that as the position and/or orientation of the headset changes, the acoustic mapping module 275 dynamically updates the portion of the acoustic map that is provided to the display assembly. As such, for any position and orientation of the headset, the displayed portion of the acoustic map describes the sound pressure distribution (or a filtered version thereof) within the current field of view of the headset that is being presented to the user as sound.

In other embodiments, the acoustic mapping module 275 generates the acoustic map using information stored in the model for a particular time period. For example, the user may request an acoustic map for some previous period of time (e.g., 5 minutes in the past), but with a current position and orientation of the headset. The acoustic mapping module 275 inputs the current determined position and orientation of the headset within the local area and the previous time period, and the model information for that time period that the acoustic mapping module 275 uses to generate the acoustic map. And the acoustic mapping module 275 provides the requested acoustic map to the display assembly for presentation to the user. The display assembly may then present the acoustic map as a virtual object that is overlaid onto the visual content being presented to the user. Note that as the position and/or orientation of the headset changes, the acoustic mapping module 275 uses information from the model to dynamically update the acoustic map that is provided to the display assembly. In this manner, for any position and orientation of the headset, the displayed portion of the acoustic map describes the sound pressure distribution (or a filtered version thereof) within the current field of view of the headset, and the sound pressure distribution (or filtered version thereof) was corresponds to sound from the requested time period (e.g., 10 min ago, yesterday at noon, etc.).

In some embodiments, the acoustic mapping module 275 may update the generated acoustic map in accordance with instructions from the command module 277. The acoustic mapping module 275 may update the acoustic map by, e.g., filtering the acoustic map to only show one or more frequencies of the sound, filtering the acoustic map to only show one or more frequency sub-bands of the sound, adjusting the acoustic map to show a sound distribution that matches a target sound distribution (e.g., provided by the command module 277), etc. And the acoustic mapping module 275 provides the updated acoustic map to the display assembly for presentation to the user. The display assembly may then present the updated acoustic map as a virtual object that is overlaid onto the visual content being presented to the user.

For example, the acoustic mapping module 275 may filter the acoustic map (e.g., in accordance with instructions from the command module 277) to only include sound pressure information in a selected sub-band. Note that the selected sub-band may be within an audible range of a human, outside of an audible range of a human, or some combination thereof. In this manner, the filtered acoustic map may visually provide the user an indication of a sound field that the user is not actually physically able to hear. For example, the filtered acoustic map may be a virtual object that illustrates high frequency sound in the sound field caused by a person blowing a dog whistle or low frequency sounds from an elephant, both of which are outside of normal human hearing.

The command module 277 adjusts the sound field in accordance with a command. The command module 277 is configured to receive commands from the user. The command module 277 may receive information from an eye tracking unit, the DCA, the PCA, a user interface, some other input, or some combination thereof. The command module 277 uses the received information to determine if a command was provided by the user. In embodiments, where the command is a gesture, the command module 277 may use information from, e.g., the DCA, the PCA, the eye tracking unit, the position sensor, or some combination thereof to determine a pose of some portion of the user. The command module 277 then determines whether the determined pose matches a gesture corresponding to a set of gestures that each map to different commands. The set of gestures may include, e.g., a pinch gesture, a wave gesture, a stretch gesture, some other gesture(s), or some combination thereof. The gestures are described in detail below with regard to FIGS. 3-6. Note that in other embodiments, the set of gestures, the types of gestures, the associated commands, or some combination thereof may differ from what is described herein. Once a command has been determined, the command module 277 instructs the acoustic mapping module 275 and the sound filter module 280 to update the acoustic map and adjust the sound in accordance with the command.

The sound filter module 280 determines sound filters for the transducer array 210. In some embodiments, the sound filter module 280 also determines sound filters for one or more in-ear devices. The sound filters are generated in part based on instructions received from the command module 277 (e.g., responsive to receiving a command). The sound filters may, e.g., be designed to adjust (e.g., attenuate or amplify) the sound from a particular sound source, globally adjust (e.g., attenuate or amplify) sound in a local areal; adjust acoustic parameters of a room to make it sounds as if the sound is occurring in a different physical environment (e.g., make a living room sound like a concert hall), some other effect on the sound, or some combination thereof. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 8).

In some embodiments, the generated sound filters are provided to the in-ear devices, and the in-ear devices generate the adjusted sound that is presented to the user. In some embodiments, the generated filters provided to the transducer array and are such that the transducer array presents audio content using the generated filters, and the audio content combines with sound from the local area to form the adjusted sound which is presented to the user. And in some embodiments, the generated sound filters are provided to both the transducer array 210 and the in-ear devices, such that the audio content generated by the transducer array combines with audio content generated by the in-ear devices and the sound from the local area to generate the adjusted sound.

Note that in some embodiments, the sensor array 220 includes one or more particle velocity sensing sensors, and the data from these sensors may be used to generate an acoustic map that is a visual representation of intensity (v. sound pressure) of sound within the local area of the headset. The acoustic map that shows sound intensity may be modified and/or used in the same or similar ways the acoustic map representing sound pressure described herein.

Figure 3:
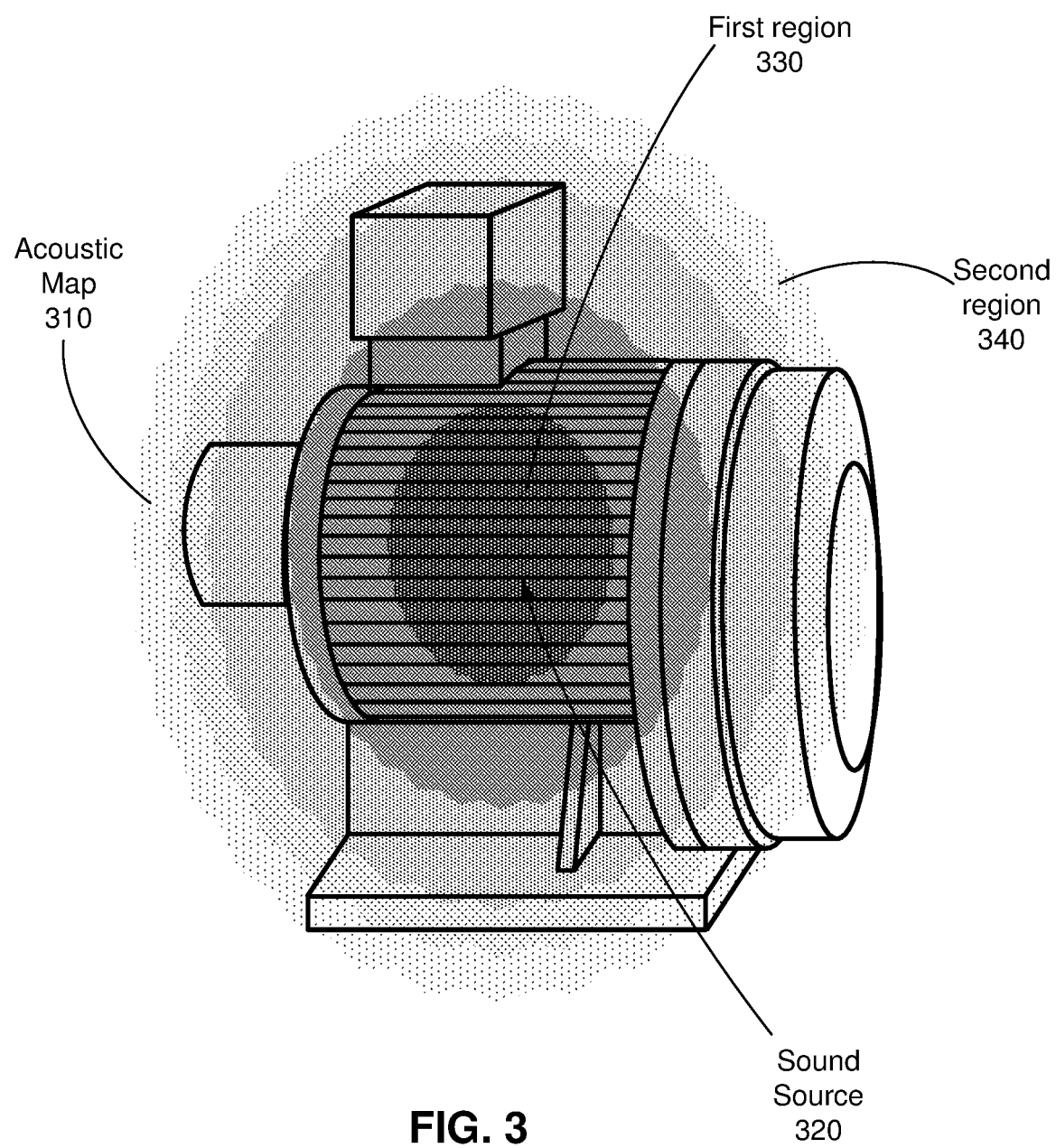
FIG. 3 is an example of visual content including an acoustic map presented by a headset, in accordance with one or more embodiments.

FIG. 3 is an example of visual content including an acoustic map 310 presented by a headset, in accordance with one or more embodiments. The visual content is of a sound source 320 that is overlaid with the acoustic map 310. The sound source 320 may be, e.g., a physical object in the real world (e.g., as part of an AR or MR experience) or a virtual object (e.g., as part of a VR experience).

As illustrated the sound source 320 is a real/physical motor that emits sound. The emitted sound forms a sound pressure distribution that lessens with distance from the sound source 320. The sound pressure distribution of the acoustic map 310 as illustrated shows sound pressure as a function of location. As illustrated, the sound pressure is highest in a first region 330, and the sound pressure decreases with distance from the first region 330. For example, the second region 340 has a sound pressure that is less than sound pressure in the first region 330. As illustrated, the first region 330 corresponds to a region where the sound pressure has a value of at least the high boundary value, and the second region 340 has a sound pressure value of at most the low boundary value. Note that while FIG. 3 illustrates 5 distinct regions of sound pressure values, in other embodiments there may be relatively smooth blending between different color values representing a more continuous representation of the sound field.

The acoustic map 310 corresponds to the sound that is being presented to the user of the headset, and that this presented sound is not necessarily the same as the actual sound emitted from the sound source 320. For example, the user may have attenuated the sound (e.g., via active noise cancellation) from the sound source 320, such that acoustic map 310 is a visual representation of the attenuated sound versus the actual sound from the sound source 320.

Note in some embodiments, the headset may present sound and an associated acoustic map that is associated with some previous time period of the local area. For example, a headset may receive a command from a user to display changes in an acoustic map over a previous time period (e.g., yesterday from 10:00 am). The headset may retrieve (e.g., from a data store) the acoustic map for the previous time period. The headset may present the retrieved acoustic map as a virtual object that is overlaid onto the visual content. The headset may also present sound associated with the acoustic map being presented.

For example, over a first time period a user monitors sound of the sound source 320. The user and/or the headset may determine that there is some problem with the sound source 320. For example, the acoustic map shows a sound pressure over a portion of the sound source that is higher than a threshold value. After a potential remedy to the problem is implemented (e.g., the user replaces a part), the headset may monitor the sound source 320 over a second time period. The user could then compare the acoustic maps for the second time period against the acoustic map of the first time period to see if the sound pressure over the portion of the sound source 310 is still higher than the threshold. If so, it may be indicative that the potential remedy did not fix the problem, and if not, it is likely that the potential remedy fixed the problem.

Figure 4:
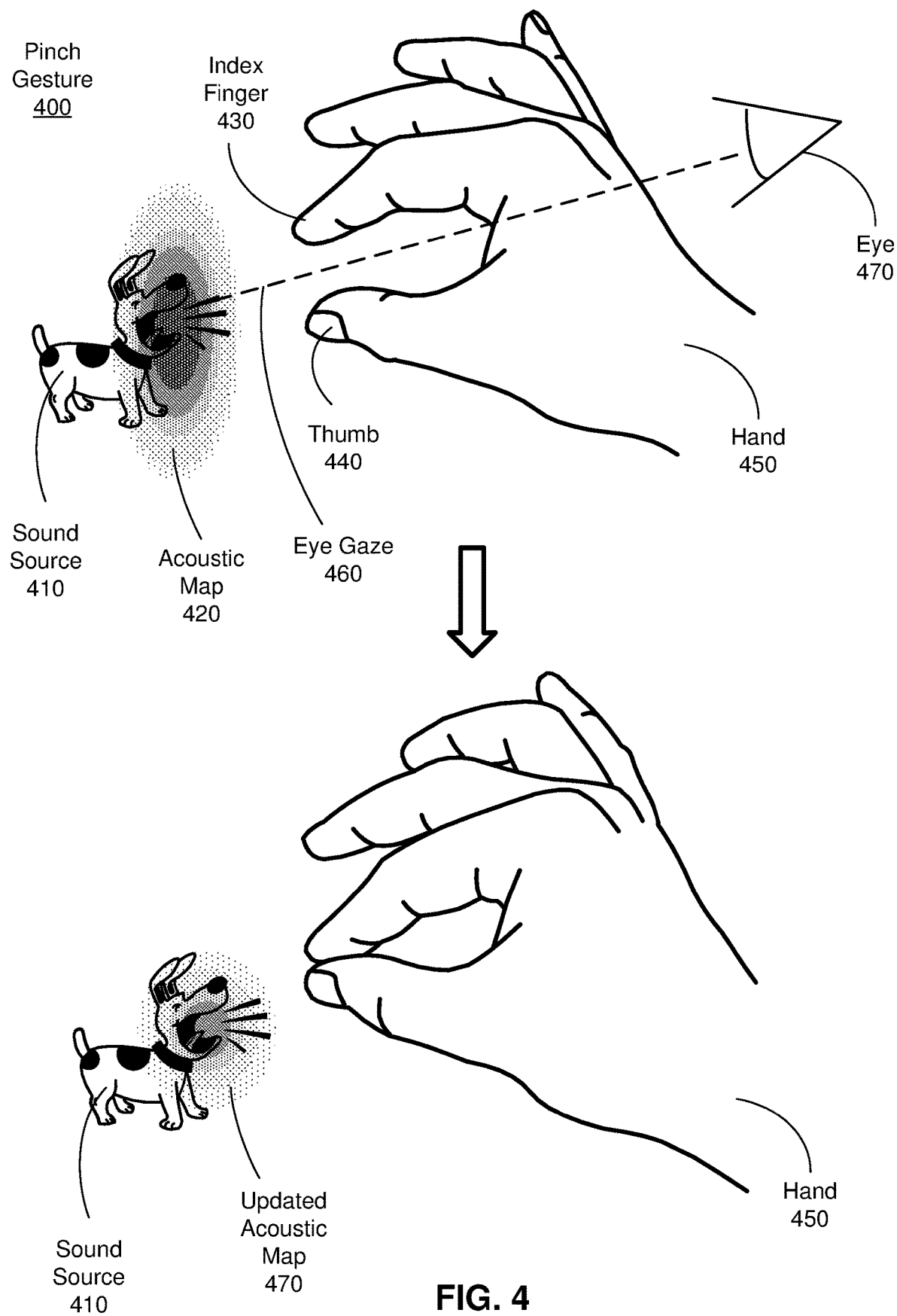
FIG. 4 is an example of a pinch gesture using to affect sound, in accordance with one or more embodiments.

FIG. 4 is an example of a pinch gesture using to affect sound, in accordance with one or more embodiments. A pinch gesture may be used to selectively adjust sound emitted from a sound source. For example, in FIG. 4, a sound source 410 is emitting sound that a headset (e.g., the headset 100) has overlaid onto visual content including the sound source 410 as an acoustic map 420. In the illustrated embodiment, the sound source 410 is a real object (e.g., a dog barking at the user). The user may form a pinch gesture by looking at the sound source 410 (or more generally a portion of the acoustic map 420) through a space between an index finger 430 and a thumb 440 of a hand 450 of the user, as if the user were going to pinch down on the portion of the acoustic map 420.

An audio system (e.g., the audio system 200) may determine that the user is forming the pinch gesture by using images captures from a camera assembly (e.g., DCA, PCA, etc.) of the headset of the hand 450 forming the pinch. The audio system uses eye tracking information from an eye tracking system on the headset to determine that an eye gaze 460 of an eye 470 is directed at portion of the acoustic map 420. The audio system uses images from the camera assembly and the eye tracking information to determine that the gaze vector 460 falls between the index finger 430 and the thumb 440 forming the pinch gesture.

Responsive to a distance between the index finger 430 and the thumb 440 shrinking, the audio system determines the command to be to reduce sound pressure of sound associated with the sound source 410. The audio system generates sound filters for a transducer array (e.g., the transducer array 210) and/or a pair of in-ear devices (e.g., in-ear device 101) that adjust the sound from the sound source 410 such that the adjusted sound presented to the user has a reduced sound pressure. The audio system also updates the acoustic map 420 to show the reduced sound pressure of the sound at the location of the sound source 410. For example, as illustrated in FIG. 4, an updated acoustic map 470 being presented to the user has a significantly lower sound pressure than the acoustic map 420. Note that the adjustment of sound from the sound source 410 being presented to the user occurs concurrent with the updating of the acoustic map. Such that as the distance between the index finger 430 and the thumb 440 decreases, the sound pressure being presented to the user for sound from the sound source 410 decreases and the sound pressure of the acoustic map (being presented to the user) that is associated with the sound of the sound source 410 also decreases.

Note that the pinch gesture illustrated in FIG. 4 shows a case for reducing sound pressure. Note that a reverse pinch gesture may be used to increase sound pressure for a particular sound source. The reverse pinch operates substantially the same way as the pinch, except that as a distance between the index finger 430 and the thumb 440 increases, the sound pressure is increased in the sound and the acoustic map is concurrently updated accordingly.

Figure 5:
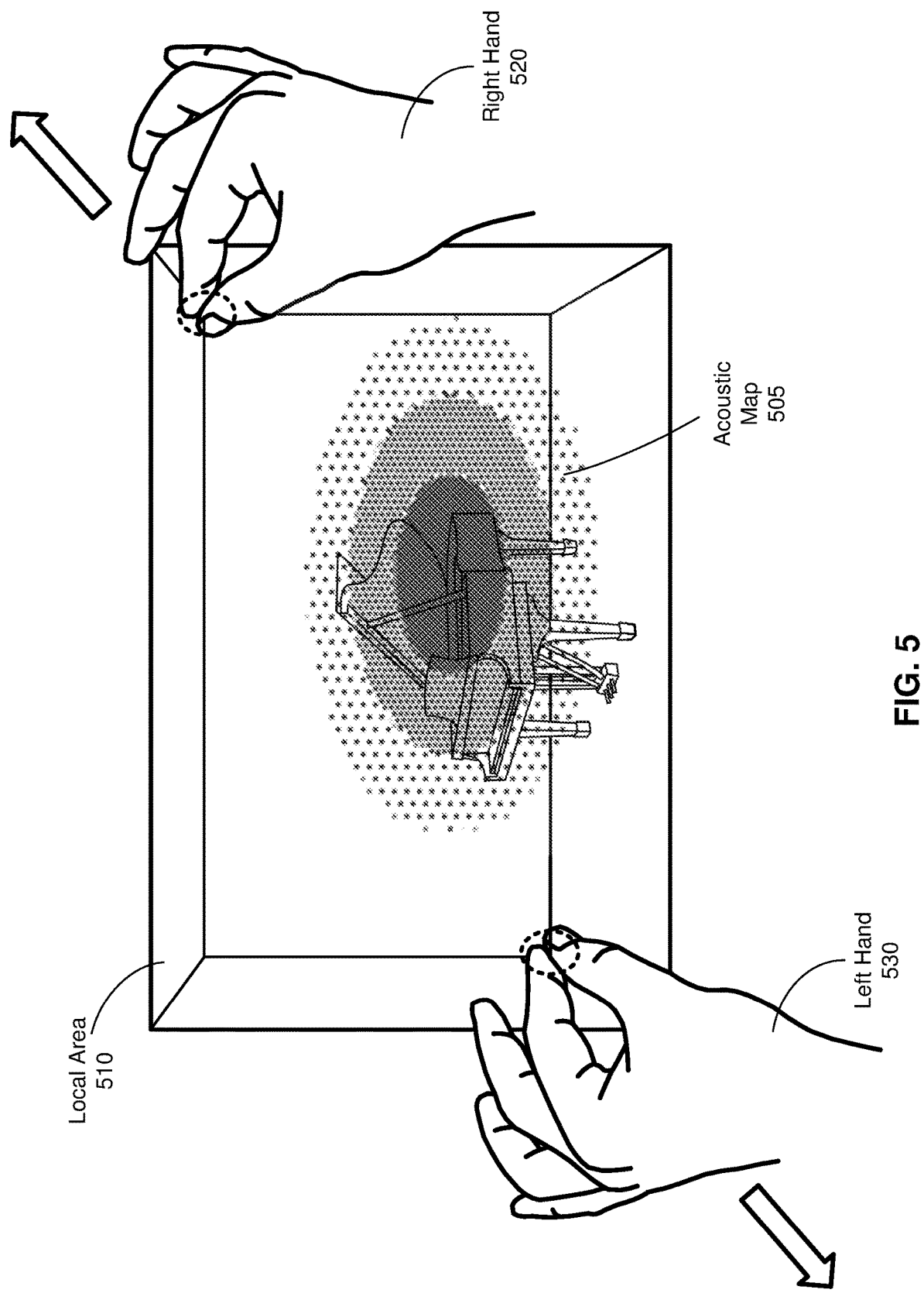
FIG. 5 is an example of a stretch gesture used to affect sound, in accordance with one or more embodiments.

FIG. 5 is an example of a stretch gesture used to affect sound, in accordance with one or more embodiments. A stretch gesture may be used to adjust acoustic parameters to zoom into an acoustic map 505 of a local area 510 (or zoom out of the acoustic map 505 with a reverse stretch gestures). Acoustic parameters are important as they control how sound is perceived (e.g., large concert hall or small room). The local area 510 has a set of acoustic parameters associated with it. The acoustic parameters may include, e.g., a reverberation time, a reverberation level, a room impulse response, A/V ratio (i.e., the ratio of the equivalent absorption surface area A available in the room to the room's volume V), some other parameters that can affect how sound is perceived in the local area 510, or some combination thereof. Values of the sound parameters are determined by, e.g., room geometry, materials that form the room (e.g., acoustic tiles, carpet, hardwood floors, etc.), objects in the room, etc. The user may form a pinch gesture with their right hand 520 and with their left hand 530 and each hand appearing to pinch a different portion of the local area. For example, the different portions of the local area may be opposite corners of the room 510, opposite walls of the room 510, etc.

An audio system (e.g., the audio system 200) may determine that the user is forming the stretch gesture by using images captured from a camera assembly (e.g., DCA, PCA, etc.) of the headset of the hands 520, 530 forming the pinch in the different portions (e.g., opposite walls or corners of a room) of the local area.

The user may then move the hands 520, 530 apart from each other as if they were stretching an object. Responsive to a distance between the pinched left hand 530 and the pinched right hand 520 increasing, the audio system determines the command to be to a stretch gesture. The audio system adjusts acoustic parameters for the local area 510 to zoom into the acoustic map 505 based in part on the change in distance. For example, as distance increases between the hands 520, 530 the user may be zooming into the acoustic map 505. This means the user is trying to enhance the audibility from that acoustic scene, by increasing a loudness of the sound. In some embodiments, as the user is zooming in the acoustic scene, the overall loudness of the scene increases gradually in increments of 1 decibel (dB). In some embodiments, the stretching may cause the acoustic parameters to change such that sound within the local area sounds as if it was generated in some other environment. For example, a piano recital may be occurring in a small classroom. The user may perform a stretch gesture, that stretches the acoustic parameters such that they are more akin to a large concert hall. The audio system then adjusts sound from the piano (and more generally the local area) in accordance with the stretched acoustic parameters, and presents (e.g., rebroadcasts it via in-ear devices) the adjusted sound. In some embodiments, the user can use a voice command to instruct the audio system to select a filter from a library of previously-stored room impulse response (RIR) filters, such that the user can command the audio system to play sounds from that acoustic map 505 as if they are being played in an acoustically different room characteristics (e.g. cinema, church, amphitheater, a small or large room, etc.). Accordingly, a user may easily and quickly adjust how sound is perceived for a given space (e.g., original room or some different environment) and/or loudness.

Note that the stretch gesture illustrated in FIG. 5 shows a case for stretching acoustic parameters. In some embodiments, a reverse stretch gesture may be used to compress sound parameters. The reverse stretch operates substantially the same way as the stretch, except that as a distance between the pinched hands 520, 530 decreases, the audio system compresses the acoustic parameters for the local area 510. For example, a reverse stretch may be used zoom out of the acoustic map 505 to reduce loudness of the sound.

Figure 6:
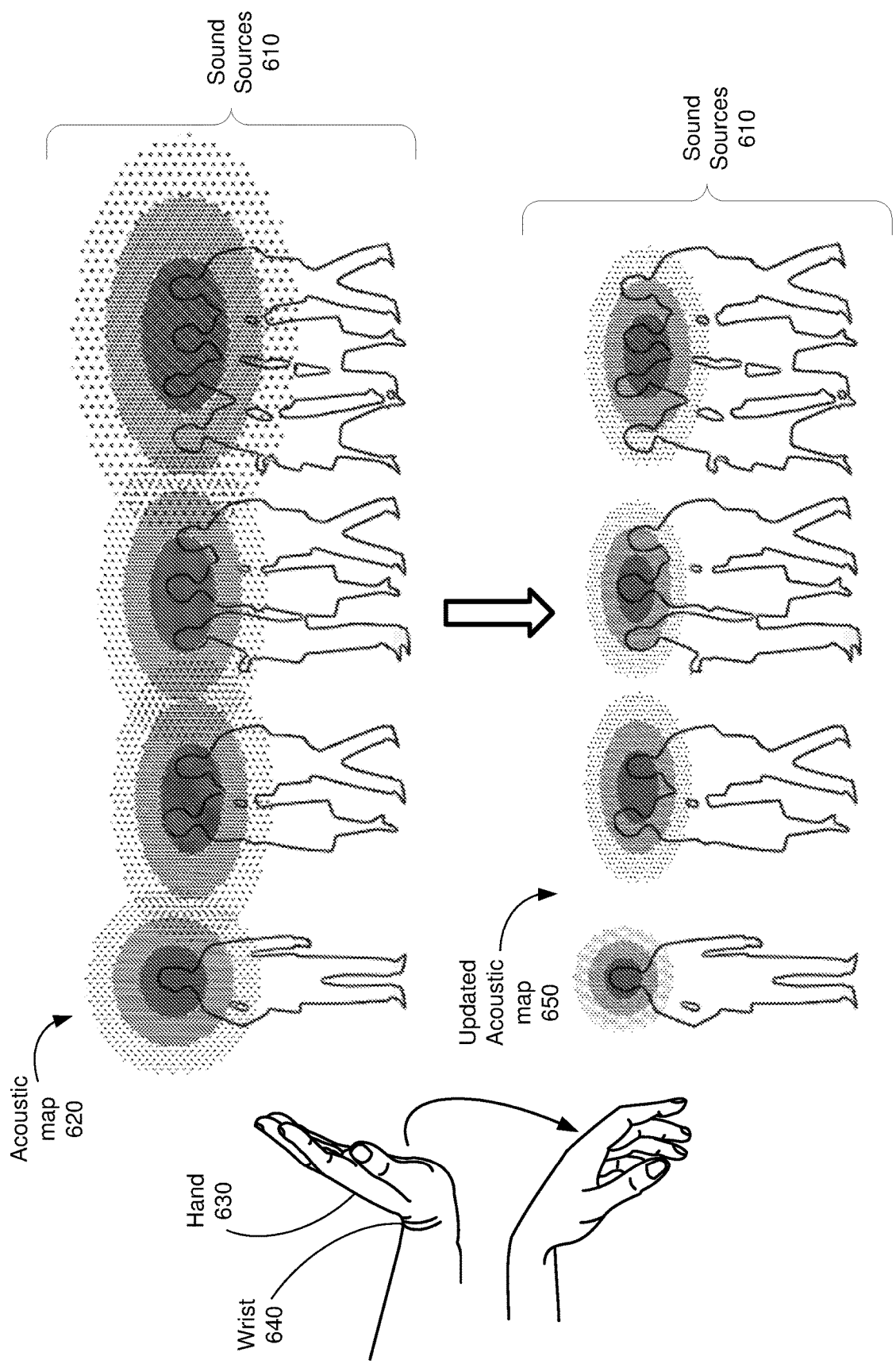
FIG. 6 is an example of a wave gesture used to affect sound, in accordance with one or more embodiments.

FIG. 6 is an example of a wave gesture used to affect sound, in accordance with one or more embodiments. A wave gesture may be used to globally adjust sound in a local area. For example, in FIG. 6, sound sources 610 are emitting sound that a headset (e.g., the headset 100) uses to generate a virtual object (an acoustic map 620) that is overlaid onto visual content including the sound sources 610. In the illustrated embodiment, the sound sources 610 are a crowd of people. Note that in other embodiments, the sounds may come from other sound sources (e.g., fan, traffic, etc.). A user may use a wave gesture (e.g., a wave gesture) to, e.g., globally decrease sound in the local area from the sound sources 610.

An audio system (e.g., the audio system 200) may determine that the user is forming the wave gesture by using images captures from a camera assembly (e.g., DCA, PCA, etc.) of the headset of the hand 630. As illustrated the captured images show the hand 630 of the user with fingers extended.

The user may bend the hand 630 at a wrist 640 toward the ground of the local area in a wave motion to form a downward wave. Responsive to a distance traveled by the hand 630, the audio system determines the command to be to a wave gesture. The distance travelled corresponds to an amount of attenuation to be applied the sound. The audio system generates sound filters for a transducer array (e.g., the transducer array 210) and/or a pair of in-ear devices (e.g., in-ear device 101) that adjust the sound from the sound sources 610 to globally attenuate their sound based on the determined amount of attenuation. The audio system also updates the acoustic map 620 to show the reduced sound pressure of the sound from the sound sources 610. For example, as illustrated in FIG. 6, an updated acoustic map 650 being presented to the user has a significantly lower sound pressure than the acoustic map 620. Note that the adjustment of sound from the sound sources 610 being presented to the user occurs concurrent with the updating of the acoustic map 620. Such that as the distance travelled by the hand 630 increases, the sound pressure being presented to the user for sound from the sound sources 610 decreases and the sound pressure of the acoustic map (being presented to the user) that is associated with the sound of the sound source also decreases.

Note that the wave gesture (a downward wave) illustrated in FIG. 6 shows a case for reducing sound pressure. Note that a reverse wave gesture (upward wave) may be used to globally increase sound pressure. The reverse wave gesture operates substantially the same way as the wave gesture, except that as the hand moves upward (in a wave motion), the sound pressure is globally increased for the sound sources 610 and, concurrently, the acoustic map is updated accordingly.

Note that the specifics of the gestures described above with regard to FIGS. 4-6 are just examples. In other embodiments, some or all of the gestures may be modified in order to accomplish a similar function.

Figure 7:
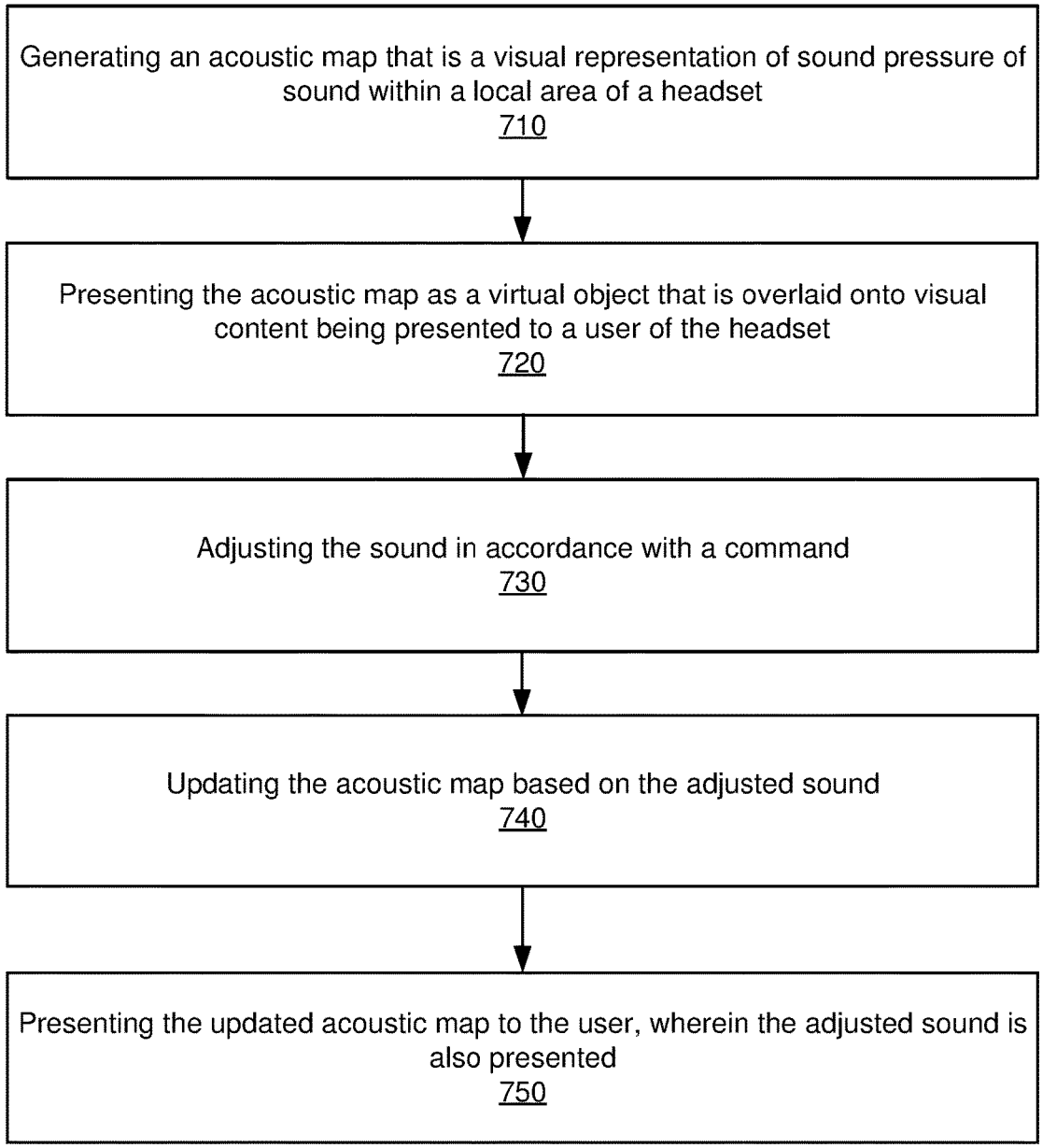
FIG. 7 is a flowchart illustrating a process for adjusting an acoustic map and presented sound, in accordance with one or more embodiments.

FIG. 7 is a flowchart of a process for adjusting an acoustic map and presented sound 700, in accordance with one or more embodiments. The process shown in FIG. 7 may be performed by components of a headset (e.g., 100) having an audio system (e.g., audio system 200). Other entities may perform some or all of the steps in FIG. 7 in other embodiments. Embodiments may include different and/or additional steps, or perform the steps in different orders.

The headset generates 710 an acoustic map that is a visual representation of sound pressure of sound within a local area of the headset. The headset may, e.g., detect, via a microphone array on the headset, the sound in the local area. The headset may determine location information for the detected sound using beamforming, and map sound pressure of the detected sound to the determined location information in order to generate the acoustic map.

The headset presents 720 the acoustic map as a virtual object that is overlaid onto visual content being presented to a user of the headset. The visual content may be virtual, from the real world, or some combination thereof. For example, in an AR or MR context, the visual content is the real world overlaid with the acoustic map.

The headset adjusts 730 the sound in accordance with a command. The command may be gesture (e.g., pinch gesture, wave gesture, etc.), a voice command, some other input from the user (e.g., button push, etc.), bone-conducted sounds or vibrations captured from the microphones or other sensors of the headset or the in-ear device (e.g., sounds created by teeth click in the ear-canal), etc. The headset updates filters used to adjust the sound in accordance with the command.

The headset updates 740 the acoustic map based on the adjusted sound. The headset adjusts the sound pressure as a function of location in accordance with the adjusted sound. For example, if the adjusted sound has a reduced sound pressure for a specific sound source, the acoustic map is updated to reflect the reduction of sound pressure for the specific sound source.

The headset presents 750 the updated acoustic map to the user, wherein the adjusted sound is also presented. The headset presents the updated acoustic map using one or more display elements. In some embodiments, headset instructs one or more in-ear devices (e.g., one for the left ear and one for the right ear) to present the adjusted sound. In some embodiments, the headset generates audio content that is presented by a transducer array on the headset. The audio content is generated such that after it would combine with the sound in the local area to form the adjusted sound. In some embodiments, the headset presents the adjusted sound using both the in-ear devices and the transducer array.

Figure 8:
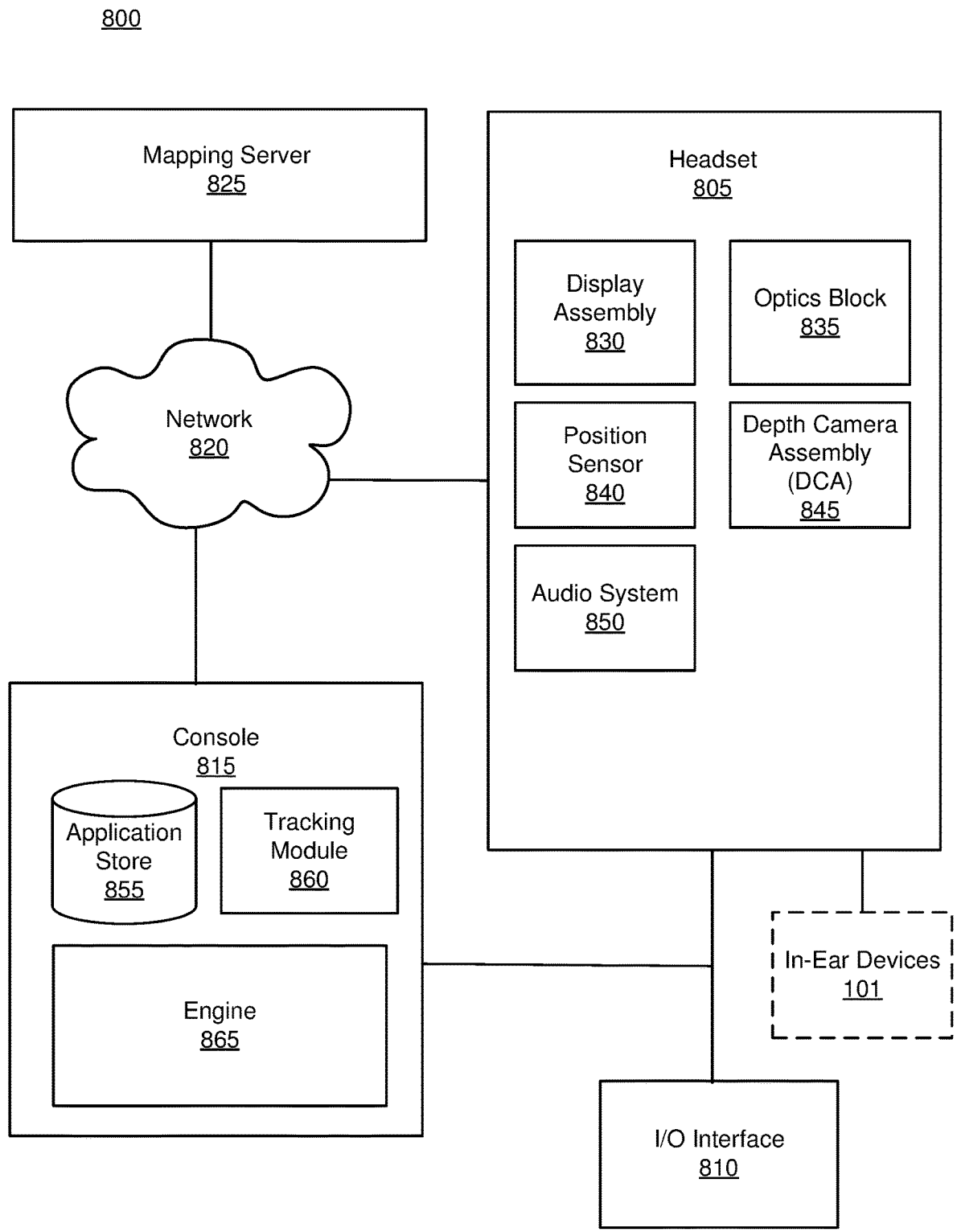
FIG. 8 is a system that includes a headset, in accordance with one or more embodiments.

FIG. 8 is a system 800 that includes a headset 805, in accordance with one or more embodiments. In some embodiments, the headset 805 may be the headset 100 of FIG. 1A or the headset 105 of FIG. 1B. The system 800 may operate in an artificial reality environment (e.g., a virtual reality environment, an augmented reality environment, a mixed reality environment, or some combination thereof). The system 800 shown by FIG. 8 includes the headset 805, an input/output (I/O) interface 810 that is coupled to a console 815, the network 820, and the mapping server 825. While FIG. 8 shows an example system 800 including one headset 805 and one I/O interface 810, in other embodiments any number of these components may be included in the system 800. For example, there may be multiple headsets each having an associated I/O interface 810, with each headset and I/O interface 810 communicating with the console 815. In alternative configurations, different and/or additional components may be included in the system 800. Additionally, functionality described in conjunction with one or more of the components shown in FIG. 8 may be distributed among the components in a different manner than described in conjunction with FIG. 8 in some embodiments. For example, some or all of the functionality of the console 815 may be provided by the headset 805.

The headset 805 includes the display assembly 830, an optics block 835, one or more position sensors 840, and the DCA 845. Some embodiments of headset 805 have different components than those described in conjunction with FIG. 8. Additionally, the functionality provided by various components described in conjunction with FIG. 8 may be differently distributed among the components of the headset 805 in other embodiments, or be captured in separate assemblies remote from the headset 805.

The display assembly 830 displays content to the user in accordance with data received from the console 815. The display assembly 830 displays the content using one or more display elements (e.g., the display elements 120). A display element may be, e.g., an electronic display. In various embodiments, the display assembly 830 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 835.

The optics block 835 may magnify image light received from the electronic display, corrects optical errors associated with the image light, and presents the corrected image light to one or both eyeboxes of the headset 805. In various embodiments, the optics block 835 includes one or more optical elements. Example optical elements included in the optics block 835 include: an aperture, a Fresnel lens, a convex lens, a concave lens, a filter, a reflecting surface, or any other suitable optical element that affects image light. Moreover, the optics block 835 may include combinations of different optical elements. In some embodiments, one or more of the optical elements in the optics block 835 may have one or more coatings, such as partially reflective or anti-reflective coatings.

Magnification and focusing of the image light by the optics block 835 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 835 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 835 corrects the distortion when it receives image light from the electronic display generated based on the content.

The position sensor 840 is an electronic device that generates data indicating a position of the headset 805. The position sensor 840 generates one or more measurement signals in response to motion of the headset 805. The position sensor 190 is an embodiment of the position sensor 840. Examples of a position sensor 840 include: one or more IMUs, one or more accelerometers, one or more gyroscopes, one or more magnetometers, another suitable type of sensor that detects motion, or some combination thereof. The position sensor 840 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 805 from the sampled data. For example, the IMU integrates the measurement signals received from the accelerometers over time to estimate a velocity vector and integrates the velocity vector over time to determine an estimated position of a reference point on the headset 805. The reference point is a point that may be used to describe the position of the headset 805. While the reference point may generally be defined as a point in space, however, in practice the reference point is defined as a point within the headset 805.

The DCA 845 generates depth information for a portion of the local area. The DCA includes one or more imaging devices and a DCA controller. The DCA 845 may also include an illuminator. Operation and structure of the DCA 845 is described above with regard to FIG. 1A.

The audio system 850 provides audio content to a user of the headset 805. The audio system 850 is substantially the same as the audio system 200 describe above. The audio system 850 may comprise one or acoustic sensors, one or more transducers, and an audio controller. The audio system 850 may provide spatialized audio content to the user. In some embodiments, the audio system 850 may request acoustic parameters from the mapping server 825 over the network 820. The acoustic parameters describe one or more acoustic properties (e.g., room impulse response, a reverberation time, a reverberation level, etc.) of the local area. The audio system 850 may provide information describing at least a portion of the local area from e.g., the DCA 845 and/or location information for the headset 805 from the position sensor 840. The audio system 850 may generate one or more sound filters using one or more of the acoustic parameters received from the mapping server 825, and use the sound filters to provide audio content to the user.

As described above with regard to FIG. 2-7, the audio system generates acoustic maps. The acoustic maps may be presented to the user via the display assembly 830. Responsive to a command, the audio system 850 adjusts the sound and adjusts the acoustic map. The command may come from, e.g., a gesture made by the user, a selection of a button, etc. The gesture (e.g., wave gesture) may be detected via, e.g., the DCA 845. The audio system 850 provides the adjusted acoustic map to the display assembly 830 for presentation to the user. The audio system 850 may present the adjusted sound using in-ear devices 101, via a transducer array (e.g., audio content that is combines with sound from the local area to form the adjusted sound), or some combination thereof.

The I/O interface 810 is a device that allows a user to send action requests and receive responses from the console 815. An action request is a request to perform a particular action. For example, an action request may be an instruction to start or end capture of image or video data, or an instruction to perform a particular action within an application. The I/O interface 810 may include one or more input devices. Example input devices include: a keyboard, a mouse, a game controller, or any other suitable device for receiving action requests and communicating the action requests to the console 815. An action request received by the I/O interface 810 is communicated to the console 815, which performs an action corresponding to the action request. In some embodiments, the I/O interface 810 includes an IMU that captures calibration data indicating an estimated position of the I/O interface 810 relative to an initial position of the I/O interface 810. In some embodiments, the I/O interface 810 may provide haptic feedback to the user in accordance with instructions received from the console 815. For example, haptic feedback is provided when an action request is received, or the console 815 communicates instructions to the I/O interface 810 causing the I/O interface 810 to generate haptic feedback when the console 815 performs an action.

The console 815 provides content to the headset 805 for processing in accordance with information received from one or more of: the DCA 845, the headset 805, and the I/O interface 810. In the example shown in FIG. 8, the console 815 includes an application store 855, a tracking module 860, and an engine 865. Some embodiments of the console 815 have different modules or components than those described in conjunction with FIG. 8. Similarly, the functions further described below may be distributed among components of the console 815 in a different manner than described in conjunction with FIG. 8. In some embodiments, the functionality discussed herein with respect to the console 815 may be implemented in the headset 805, or a remote system.

The application store 855 stores one or more applications for execution by the console 815. An application is a group of instructions, that when executed by a processor, generates content for presentation to the user. Content generated by an application may be in response to inputs received from the user via movement of the headset 805 or the I/O interface 810. Examples of applications include: gaming applications, conferencing applications, video playback applications, or other suitable applications.

The tracking module 860 tracks movements of the headset 805 or of the I/O interface 810 using information from the DCA 845, the one or more position sensors 840, or some combination thereof. For example, the tracking module 860 determines a position of a reference point of the headset 805 in a mapping of a local area based on information from the headset 805. The tracking module 860 may also determine positions of an object or virtual object. Additionally, in some embodiments, the tracking module 860 may use portions of data indicating a position of the headset 805 from the position sensor 840 as well as representations of the local area from the DCA 845 to predict a future location of the headset 805. The tracking module 860 provides the estimated or predicted future position of the headset 805 or the I/O interface 810 to the engine 865.

The engine 865 executes applications and receives position information, acceleration information, velocity information, predicted future positions, or some combination thereof, of the headset 805 from the tracking module 860. Based on the received information, the engine 865 determines content to provide to the headset 805 for presentation to the user. For example, if the received information indicates that the user has looked to the left, the engine 865 generates content for the headset 805 that mirrors the user's movement in a virtual local area or in a local area augmenting the local area with additional content. Additionally, the engine 865 performs an action within an application executing on the console 815 in response to an action request received from the I/O interface 810 and provides feedback to the user that the action was performed. The provided feedback may be visual or audible feedback via the headset 805 or haptic feedback via the I/O interface 810.

The network 820 couples the headset 805 and/or the console 815 to the mapping server 825. The network 820 may include any combination of local area and/or wide area networks using both wireless and/or wired communication systems. For example, the network 820 may include the Internet, as well as mobile telephone networks. In one embodiment, the network 820 uses standard communications technologies and/or protocols. Hence, the network 820 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 820 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 820 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 825 may include a database that stores a model describing a plurality of spaces, wherein one location in the model corresponds to a current configuration of a local area of the headset 805. The mapping server 825 receives, from the headset 805 via the network 820, information describing at least a portion of the local area and/or location information for the local area. The user may adjust privacy settings to allow or prevent the headset 805 from transmitting information to the mapping server 825. The mapping server 825 determines, based on the received information and/or location information, a location in the model that is associated with the local area of the headset 805. The mapping server 825 determines (e.g., retrieves) one or more acoustic parameters associated with the local area, based in part on the determined location in the model and any acoustic parameters associated with the determined location. The mapping server 825 may transmit the location of the local area and any values of acoustic parameters associated with the local area to the headset 805.

One or more components of system 800 may contain a privacy module that stores one or more privacy settings for user data elements. The user data elements describe the user or the headset 805. For example, the user data elements may describe a physical characteristic of the user, an action performed by the user, a location of the user of the headset 805, a location of the headset 805, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 800 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

ADDITIONAL CONFIGURATION INFORMATION

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   generating an acoustic map that is a visual representation of sound pressure of sound within a local area of a headset;
   presenting, via a display of the headset, the acoustic map as a virtual object that is overlaid onto visual content being presented to a user of the headset;
   adjusting the sound in accordance with a command;
   updating the acoustic map based on the adjusted sound; and
   presenting the updated acoustic map to the user, wherein the adjusted sound is also presented to the user.

2. The method of claim 1, further comprising:
   detecting, via a microphone array on the headset, the sound in the local area,
   wherein generating the acoustic map comprises:
      determining location information for the detected sound using beamforming, and
      mapping sound pressure of the detected sound to the determined location information in order to generate the acoustic map.

3. The method of claim 1, further comprising:
   filtering the acoustic map to display a sub-band of the detected sound.

4. The method of claim 3, wherein the sub-band is selected by the user.

5. The method of claim 1, wherein the command is based on a pinch gesture, the method further comprising:
   capturing, via a camera assembly of the headset, the pinch gesture of the user forming a pinch of an index finger and a thumb of a hand of the user; and
   determining that an eye gaze of the user is on a sound source in the local area, and that the eye gaze falls between the index finger and the thumb forming the pinch gesture,
   wherein adjusting the sound in accordance with the command and updating the acoustic map based on the adjusted sound comprises:
      responsive to a distance between the index finger and the thumb shrinking,
         reducing sound pressure of the sound from the sound source, and
         updating the acoustic map to show the reduced sound pressure of the sound at the location of the sound source.

6. The method of claim 1, wherein the command is based on a stretch gesture, the method further comprising:
   capturing, via a camera assembly of the headset, the stretch gesture, the stretch gesture comprising:
      a left hand of the user and a right hand of the user each pinching a portion of the local area,
      detecting a change in distance between the right hand and the left hand that are pinching, and
   wherein adjusting the sound in accordance with the command comprises:
      adjusting acoustic parameters for the local area based in part on the change in distance, and
      adjusting the sound in accordance with the adjusted acoustic parameters.

7. The method of claim 6, wherein the change in distance is an increase in distance, and the adjusted acoustic parameter are such that the adjusted sound appears to be in occurring in a larger local area.

8. The method of claim 1, wherein the command is based on a wave gesture, the method further comprising:
   capturing, via a camera assembly of the headset, the wave gesture of the user, the wave gesture comprising a hand of the user with fingers extended and a wrist bends the hand toward a ground of the local area,
   wherein adjusting the sound in accordance with the command and updating the acoustic map based on the adjusted sound comprises:
      reducing sound pressure of the sound for all the sound in the local area, and
      updating the acoustic map to show the reduced sound pressure of the sound in the local area.

9. The method of claim 1, wherein the command is based on a wave gesture, the method further comprising:
   capturing, via a camera assembly of the headset, the wave gesture of the user, the wave gesture comprising a hand of the user with fingers extended and a wrist bends the hand away from a ground of the local area,
   wherein adjusting the sound in accordance with the command and updating the acoustic map based on the adjusted sound comprises:
      increasing sound pressure of the sound for all the sound in the local area, and updating the acoustic map to show the increased sound pressure of the sound in the local area.

10. The method of claim 1, further comprising:
receiving a command from a user to display changes in the acoustic map over a previous time period;
retrieving the acoustic map for the previous time period; and
presenting, via the display, the retrieved acoustic map as a virtual object that is overlaid onto the visual content.

11. The method of claim 1, wherein the adjusted sound is presented to the user via using a speaker of an in-ear device that fits within an ear canal of the user.

12. The method of claim 1, wherein presenting the adjusted sound to the user comprises:
presenting audio content using a speaker array of the headset, wherein the audio content combines with sound from the local area to form the adjusted sound which is presented to the user.

13. A headset comprising:
a microphone array configured to detect sound in a local area of the headset;
a display configured to present visual content to a user;
a controller configured to:
generate an acoustic map that is a visual representation of sound pressure of sound within a local area of the headset,
instruct the display to present the acoustic map as a virtual object that is overlaid onto the visual content being presented to the user,
adjust the sound in accordance with a command,
update the acoustic map based on the adjusted sound, and
instruct the display to present the updated acoustic map, wherein the adjusted sound is presented to the user.

14. The headset of claim 13, wherein the controller is further configured to:
determine location information for the detected sound using beamforming, and
map sound pressure of the detected sound to the determined location information in order to generate the acoustic map.

15. The headset of claim 13, further comprising:
a camera assembly configured to capture a pinch gesture of the user, the pinch gesture forming a pinch of an index finger and a thumb of a hand of the user; and
an eye tracking system configured to determine an eye gaze of the user,
wherein the controller is further configured to:
determine that the eye gaze is on a sound source in the local area, and that the eye gaze falls between the index finger and the thumb forming the pinch gesture,
responsive to a distance between the index finger and the thumb shrinking,
reduce sound pressure of the sound from the sound source, and
update the acoustic map to show the reduced sound pressure of the sound at the location of the sound source.

16. The headset of claim 13, further comprising:
a camera assembly configured to capture images of a left hand and a right hand of the user,
wherein the controller is further configured to:
determine that the captured images form a stretch gesture, the stretch gesture formed by:
a left hand of the user and a right hand of the user each pinching a portion of the local area,
a change in distance between the right hand and the left hand that are pinching, and
adjust acoustic parameters for the local area based in part on the change in distance, and
adjust the sound in accordance with the adjusted acoustic parameters.

17. The headset of claim 13, further comprising:
a camera assembly configured to capture images of a wrist and hand of the user,
wherein the controller is further configured to:
determine that the captured images form a wave gesture, the wave gesture formed by:
the hand of the user with fingers extended and the wrist bends the hand toward a ground of the local area;
reduce sound pressure of the sound for all the sound in the local area; and
update the acoustic map to show the reduced sound pressure of the sound in the local area.

18. The headset of claim 13, wherein the adjusted sound is presented to the user using a speaker of an in-ear device that fits within an ear canal of the user.

19. The headset of claim 12, further comprising:
a speaker array configured to present audio content, wherein the audio content combines with sound from the local area to form the adjusted sound which is presented to the user.

20. A non-transitory computer readable medium configured to store program code instructions, when executed by a processor, cause the processor to perform steps comprising:
generating an acoustic map that is a visual representation of sound pressure of sound within a local area of a headset;
presenting, via a display of the headset, the acoustic map as a virtual object that is overlaid onto visual content being presented to a user of the headset;
adjusting the sound in accordance with a command;
updating the acoustic map based on the adjusted sound; and
presenting the updated acoustic map to the user, wherein the adjusted sound is also presented to the user.

* * * * *

UNITED STATES PATENT AND TRADEMARK OFFICE
CERTIFICATE OF CORRECTION

PATENT NO. : 11,470,439 B1
APPLICATION NO. : 17/336817
DATED : October 11, 2022
INVENTOR(S) : Morteza Khaleghimeybodi et al.

It is certified that error appears in the above-identified patent and that said Letters Patent is hereby corrected as shown below:

In the Claims

In Column 28, Claim 19, Line 35, delete "claim 12," and insert -- claim 13, --, therefor.

Signed and Sealed this
Fourteenth Day of February, 2023

Katherine Kelly Vidal
*Director of the United States Patent and Trademark Office*